US011275758B2

(12) United States Patent
Tran et al.

(10) Patent No.: US 11,275,758 B2
(45) Date of Patent: Mar. 15, 2022

(54) EXPORTING AND IMPORTING DATABASE CONTAINERS

(71) Applicant: SAP SE, Walldorf (DE)

(72) Inventors: Le-Huan Stefan Tran, Malsch (DE); Jonathan Bregler, Kraichtal (DE); Alexander Bunte, Heidelberg (DE); Arne Harren, Walldorf (DE); Andreas Kellner, Birkenau-Löhrbach (DE); Daniel Kuntze, Bruchsal (DE); Vladislav Leonkev, Sandhausen (DE); Simon Lueders, Walldorf (DE); Volker Sauermann, Dossenheim (DE); Michael Schnaubelt, Leimen (DE)

(73) Assignee: SAP SE, Walldorf (DE)

( * ) Notice: Subject to any disclaimer, the term of this patent is extended or adjusted under 35 U.S.C. 154(b) by 351 days.

(21) Appl. No.: 16/406,757

(22) Filed: May 8, 2019

(65) Prior Publication Data

US 2019/0266171 A1      Aug. 29, 2019

Related U.S. Application Data

(63) Continuation of application No. 15/222,032, filed on Jul. 28, 2016, now Pat. No. 10,387,443.
(Continued)

(51) Int. Cl.
*G06F 16/21* (2019.01)
*G06F 16/25* (2019.01)
(Continued)

(52) U.S. Cl.
CPC ............ *G06F 16/258* (2019.01); *G06F 16/21* (2019.01); *G06F 16/214* (2019.01); *G06F 16/24554* (2019.01); *G06F 21/6218* (2013.01)

(58) Field of Classification Search
CPC .... G06F 16/27; G06F 16/2282; G06F 16/214; G06F 16/217; G06F 16/211; G06F 16/25
See application file for complete search history.

(56) References Cited

U.S. PATENT DOCUMENTS

| | | | |
|---|---|---|---|
| 7,996,904 B1 * | 8/2011 | Chiueh | G06F 21/566 |
| | | | 726/24 |
| 9,223,554 B1 | 12/2015 | Lawson | |

(Continued)

*Primary Examiner* — Etienne P Leroux
*Assistant Examiner* — Cindy Nguyen
(74) *Attorney, Agent, or Firm* — Fish & Richardson P.C.

(57) ABSTRACT

A computer-implemented method for exporting a database container from a database includes exporting database container metadata including artifact definitions in the metadata along with the actual metadata content to a database management system, exporting the database container including the database objects deployed therein to the database management system. The exporting of the database container includes exporting dependencies and structures of the database objects deployed therein, but not the actual content of the database objects. In some instances, however, exporting of the database container can include exporting the actual content of the database objects in response to user request. The method further includes packing the exported database container metadata and the exported database container in an archive. The data in the archive can be unpacked in substantially reverse order to import the database container into another database.

17 Claims, 4 Drawing Sheets

Related U.S. Application Data

(60) Provisional application No. 62/333,439, filed on May 9, 2016.

(51) Int. Cl.
*G06F 16/2455* (2019.01)
*G06F 21/62* (2013.01)

(56) References Cited

U.S. PATENT DOCUMENTS

| | | | |
|---|---|---|---|
| 2010/0138821 A1* | 6/2010 | Driesen | G06F 8/65 717/168 |
| 2014/0136257 A1* | 5/2014 | Amulu | G06Q 10/067 705/7.15 |
| 2015/0025925 A1 | 1/2015 | Moore et al. | |
| 2015/0074056 A1 | 3/2015 | Kellner et al. | |
| 2016/0253404 A1* | 9/2016 | Fabijancic | G06F 16/21 707/625 |

* cited by examiner

```
┌─────────────────────────────────────────────┐
│ Unpack the export archive or file to separate│
│ constituent common metadata, container, and  │
│ container metadata information               │
│ 402                                          │
└─────────────────────────────────────────────┘
                      │
                      ▼
┌─────────────────────────────────────────────┐
│ Create target objects with the same structures│
│ as the objects (e.g., calculation views,     │
│ shadow tables, etc.) identified by common    │
│ metadata and populate the target tables with │
│ the container-related data                   │
│ 404                                          │
└─────────────────────────────────────────────┘
                      │
                      ▼
┌─────────────────────────────────────────────┐
│ Create objects corresponding to dependencies │
│ of the deployed database objects (e.g.,      │
│ synonyms, generic business application data  │
│ object, etc.) that are identified by the     │
│ container metadata                           │
│ 406                                          │
└─────────────────────────────────────────────┘
                      │
                      ▼
┌─────────────────────────────────────────────┐
│ Create an imported container with database   │
│ objects (e.g., view 201, table 202, synonym  │
│ 203, etc.) deployed therein                  │
│ 408                                          │
└─────────────────────────────────────────────┘
```

FIG. 4

EXPORTING AND IMPORTING DATABASE CONTAINERS

CROSS-REFERENCE TO RELATED APPLICATIONS

This application is a non-provisional of, and claims priority to, U.S. patent application Ser. No. 15/222,032 filed Jul. 28, 2016; entitled EXPORTING AND IMPORTING DATABASE CONTAINERS; which is a Continuation of, and claims priority to, U.S. Provisional Application No. 62/333,439 filed May 9, 2016, entitled DATABASE DEPLOYMENT CONTAINERS, the disclosure of which is incorporated by reference herein in its entirety.

BACKGROUND

In the context of computers and computer programs (e.g., applications) that are used in information technology, a database is an organized or structured collection of data (values). The data in the database may include data describing instances of database objects (e.g., tables, queries, reports, views and other objects) and may include schemas describing the types or structures of the database objects.

Large database systems (e.g., enterprise resource planning ("ERP") systems and customer relationship management ("CRM") systems) can include database objects that store and organize data, as well as database objects for accessing the data. For example, in some database systems a database object may include a table, an index, and a view, as well as a procedure for accessing one or more tables, a procedure importing data into one or more tables, or a procedure that manipulates the data in one or more tables. Pushing down data-intensive computations into the database layer minimizes data transfers between the database layer and an application layer and takes advantage of in-memory capabilities, which are becoming more common. Because the database objects of such a system include procedures and other objects for manipulating the data, an application developer may himself or herself develop some of the database objects, for example, by developing design-time artifacts that are deployed to the database as run-time database objects.

"Artifacts," as the term is often used in the context of software development, may be understood to refer to data models, workflow diagrams, test matrices and plans, setup scripts, use cases, class diagrams, UML models, requirements, design documents or other documents, which help describe the function, architecture, and design of a software product (e.g., a database object). In some instances, the term database "artifacts" may be used to refer to the software product itself (e.g., the database object itself).

A database management system (DBMS) may provide access to data in the database. The DBMS may provide various functions that allow entry, storage, and retrieval of information and provide ways to manage how that information is organized in the database. The DBMS may be used to manage more than one database. Both the database and its DBMS may conform to the principles of a particular database model (e.g. hierarchical, relational, network, document, etc.). Often the term "database" is used to refer to both the database and the DBMS used to manipulate the database. Further, the term "database system" may be used to refer collectively to the database model, the database management system, and the database.

In some database systems, one or more of the database objects deployed in the database may be grouped or packaged in a so-called container (hereinafter—a database container or a run-time container). The database container may be a class, a data structure (or schema), or an abstract data type whose instances are collections of other objects. The database container may store objects in an organized way that follows specific access rules. For example, the database container may act as a sandbox to isolate database objects in the container from deployment and run-time errors of other database objects or containers in the database. Access to database container content may be controlled by database privileges, for example, by granting SELECT or EXECUTE privileges.

The present disclosure relates to importing or exporting a database with deployed database or run-time containers therein.

SUMMARY

A database container schema provides an isolated computing environment for one or more database objects deployed in the database container in a database. Computer-implemented methods for exporting such a database container from a first database and importing the database container into a second database, respectively, are disclosed herein.

In a general aspect, a container export method includes exporting database container metadata including artifact definitions in the metadata along with the actual metadata content, exporting the database container including the database objects deployed therein, and packing the exported database container metadata and the exported database container in an archive. The archive may be a binary file.

In a general aspect, a container import method includes unpacking an archive, which includes a copy of the database container exported from the first database, a copy of database container metadata exported from the first database and a copy of common metadata exported from the first database. The import method includes creating target objects in second database with the same structures as objects identified by the common metadata and populating the target objects only with container-related data rows from the archive, and further creating an imported database container with deployed database objects therein. The imported database container and the deployed database objects therein have the same structures and dependencies as the database container exported from the first database, but not including the data content of the database container of the first database in the imported database container. The import method further includes creating objects corresponding to dependencies of the deployed database objects that are identified by the container metadata.

The details of one or more implementations are set forth in the accompanying drawings and the description below. Further features of the disclosed subject matter, its nature, and various advantages will be more apparent from the accompanying drawings, the following detailed description, and the claims.

DETAILED DESCRIPTION

A deployed database container may be generated and maintained in a database for specific application tasks and may, thus, represent actions and data elements related to a real-world or conceptual object, such as a sales order, an invoice, a schedule, etc. For example, a database container may be created for a sales order and may include instructions for performing specific tasks on the data related to the sales order, as well as defining the sales data itself. A deployed database container may access another container via a private name or synonym for the other container, if the other container allows such access. Database containers may be complex, with hundreds or even thousands of database artifacts, making deployment of the artifacts difficult and time consuming.

Importing or exporting deployed database containers from one database to another database or datastore may be relevant or useful in scenarios involving, for example, database migration, copy, backup, testing, debugging, version upgrading, etc.

Figure 1:
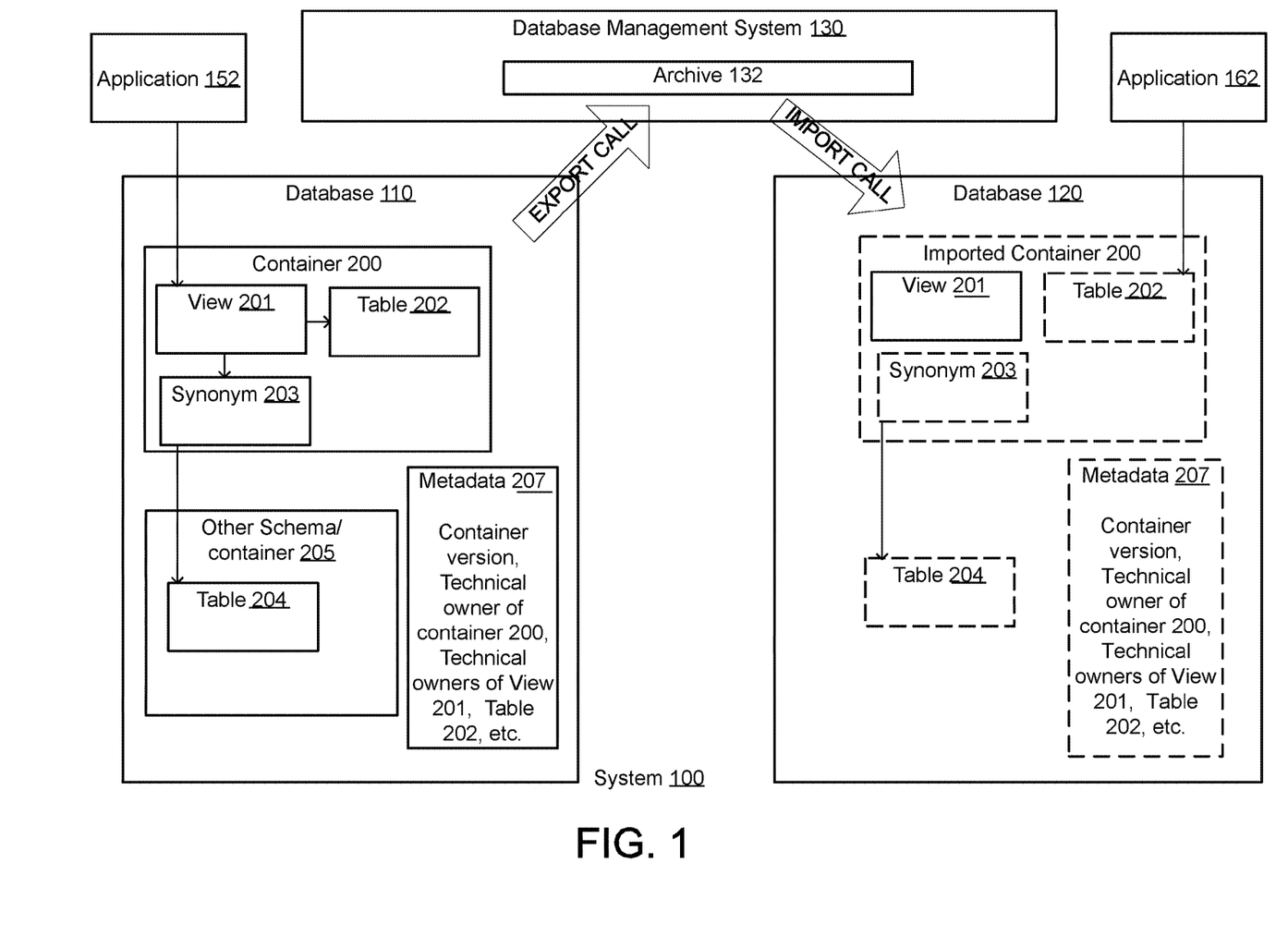
FIG. 1 is a block diagram illustration of an example database system used to import or export a deployed database container from a first database to a second database, in accordance with the principles of the present disclosure.

FIG. 1 shows an example database system 100 that may be used to illustrate an example processes for importing or exporting a deployed database container from a first database to a second database, in accordance with the principles of the present disclosure.

Database system 100 may include a first database 110 and a second database 120, which may be accessible, for example, to respective applications 152 and 162 running on respective client computers (not shown). Both database 110 and database 120 may be managed by, for example, a common data base management system (DBMS) 130. Database 110 may include one or more database objects (e.g., tables, views, indexes, core data services ("CDS"), calculation views, table import procedures, sequences, etc.) that are organized or arranged in containers (e.g., database container 200, database container 205, etc.). Each container may provide an isolated environment for the database objects therein. For example, each container may be a separate database schema and act as a sandbox to insulate the database objects therein from deployment and run-time errors of other containers. Database container 200 may, for example, provide an isolated environment for application 152 to interact with view 201, table 202, synonym 203, etc. Synonym 203 may provide a link by which objects in container 200 (or application 152 operating through objects in container 200) can access data external to container 200. For example, synonym 203, as shown in FIG. 1, may provide a link for view 201 in container 200 to access table 204, which may be deployed in another container 205 external to container 200 in database 110. Synonym 203 may be referred to as a "private" synonym of container 200 when it is specific to container 200 and can be only used from within container 200 to access its corresponding external object (e.g., table 204 deployed in another container 205). Authorizations to access the external object (e.g., table 204) may be associated with authorizations to access the private synonym (e.g., synonym 203) in container 200. Thus, if application 152 does not have permission to access table 204 in container 205, database 110 may issue a run-time error when application 152/view 201 attempts to call synonym 203 in container 200 to access table 204 in container 205.

In addition to the database objects deployed in the containers, database 110 may store metadata, for example, metadata related to the containers themselves, at a location external to the containers in the database. FIG. 1 shows, for example, container metadata 207 stored in a location external to the containers in database 110. Container metadata 207 may, for example, include metadata specific to container 200 (e.g., container 200 version information and data identifying technical owners or authorized users of container 200 and individual database objects therein (e.g., view 201, table 202, etc.)) Other metadata (e.g., common metadata 209, FIG. 2), which may be stored in a location external to the containers in database 110, may include metadata that is not limited or specific to container 200. Such metadata may, for example, relate to external database objects (e.g., complex procedures, calculation views, etc.) that may be accessible to container 200 or other containers, for example, via synonyms.

Importing or exporting deployed database container 200 from database 110 to another database or datastore (e.g., database 120) may be relevant in scenarios involving, for example, database migration, copy, backup, testing, debugging, upgrading, etc.

As an example, a database administrator noting an error or problem with processing of data (e.g., customer data) in database container 200 (e.g., in the execution of application 152) may want to export the problematic container from database 140 to a back office computer for analysis or debugging. In principle, the entire problematic container (e.g., database container 200) with all of its data content (e.g., in view 201, table 202 and synonym 203, etc.) could be saved or archived to a file in a traditional database export operation using, for example, SQL SAVE commands provided by DBMS 130, and the file transferred to the back office computer for analysis or debugging. However, such a traditional database export operation exporting all of the data content of container 200 to the back office computer presents a risk of improper disclosure of the data. The data content of a container may, for example, include a customer's private data or other sensitive data, which could be undesirably exposed (e.g., at the back office computer) to unauthorized parties.

Further, the traditional database export operation may not export all of the data relevant to debugging the error or problem with the processing of data in the execution of application 152 as the data accessed by application 152 in database 110 may not reside only in database container 200, but may also reside in database schemata or structures external to database container 200 (e.g., table 204 in other schema 205). Furthermore, database artifacts related to database container 200 (e.g., metadata 207 including container version information, etc.) may be stored at a location external to database container 200.

Figure 2:
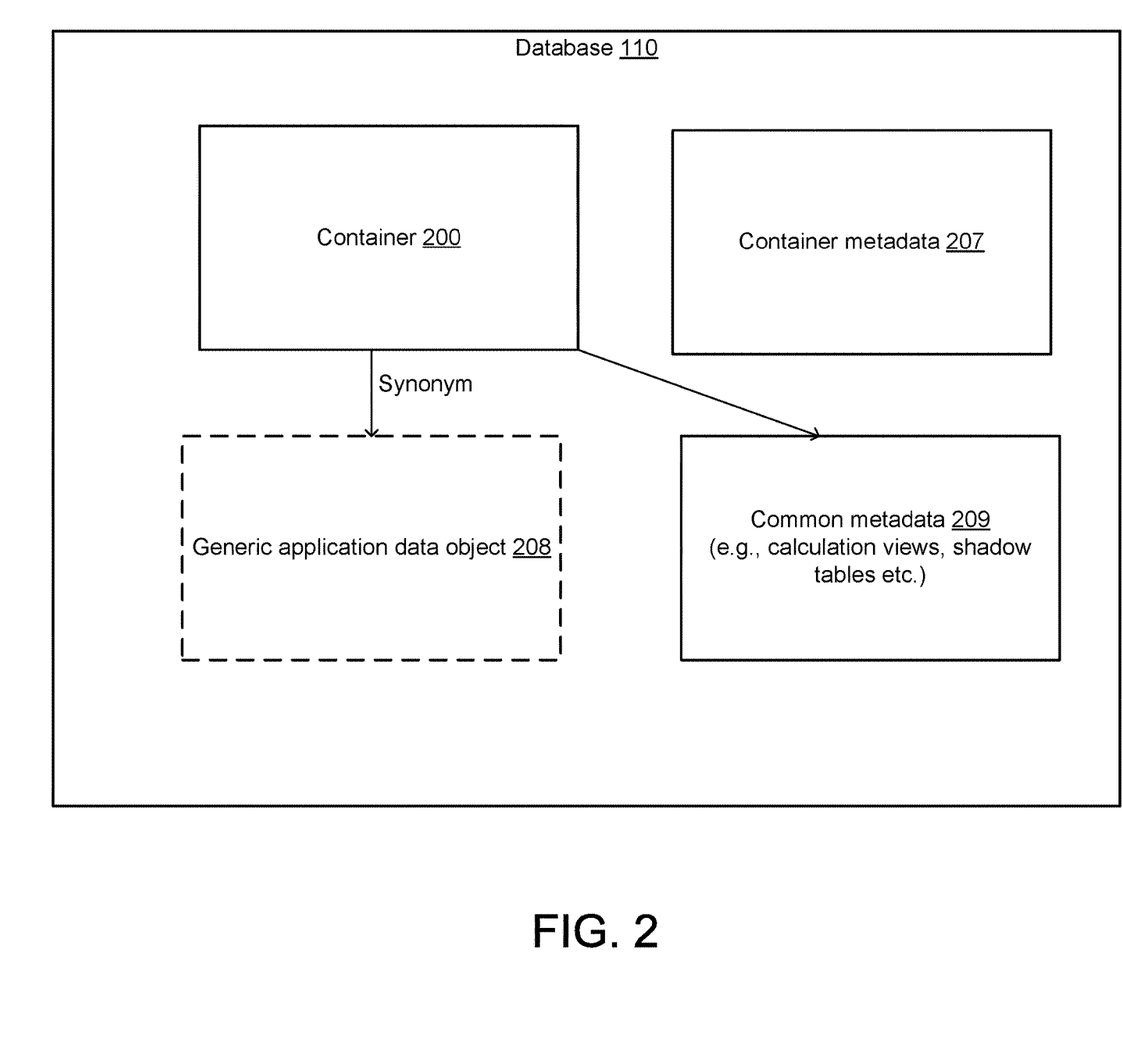
FIG. 2 is a schematic diagram identifying structural data related to a database container that may reside in a database and that can be exported along with the database container to make the exported database container fully functional in a new location, in accordance with the principles of the present disclosure.

FIG. 2 schematically shows the relevant structural data related to database container 200 that may reside in database 110 and should be exported along with database container 200 to make the exported database container fully functional in its new location. The relevant structural data, in addition to database container 200, may include, for example, container metadata 207 (e.g. container version information, etc.), generic application data object 208 (e.g., table 204, which may be accessed from database container 200 via a synonym (e.g., synonym 203)) and common metadata 209 (e.g., metadata describing common database objects in database 110 such as calculation views and shadow tables, etc., that may involve or use multiple data sources including container 200 data objects, but are stored outside container 200).

Figure 3:
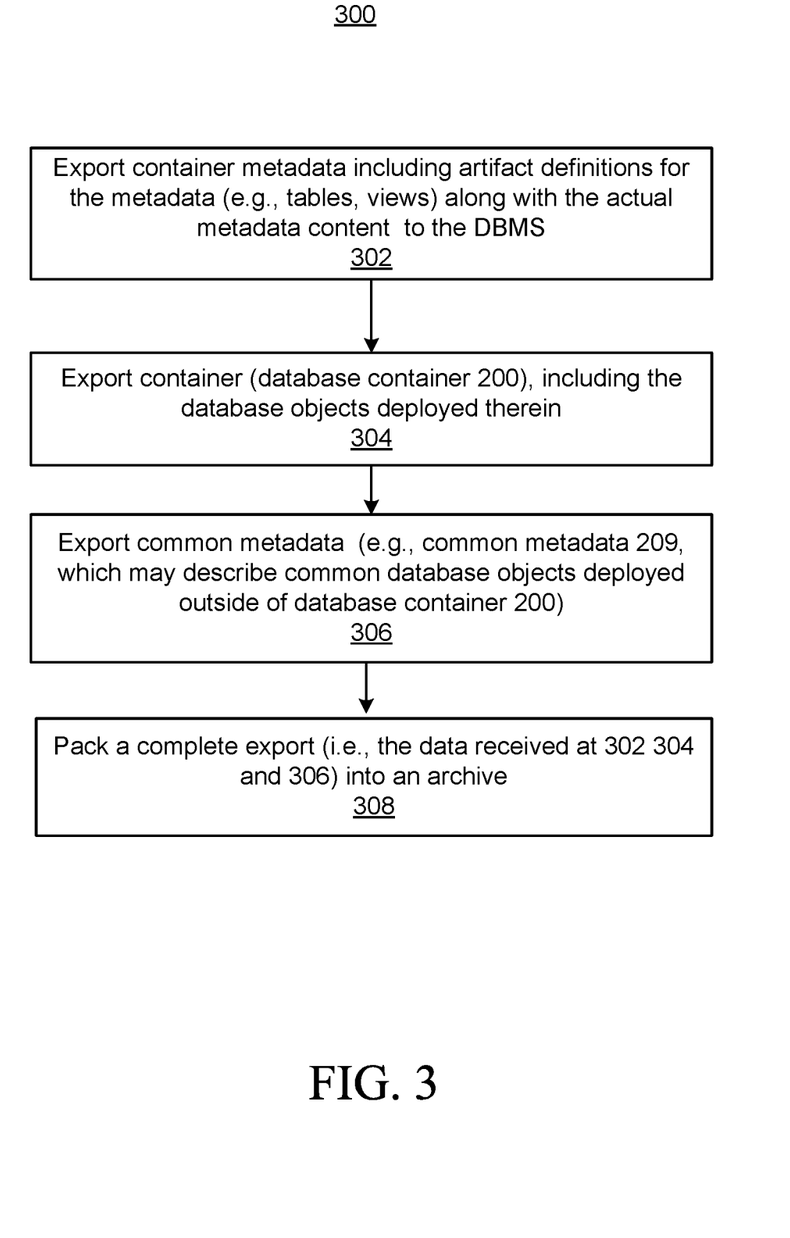
FIG. 3 is a flowchart illustrating an example method for exporting a database container from a database, in accordance with the principles of the present disclosure.

FIG. 3 is a flowchart of an example method 300 for exporting a database container, in accordance with the principles of the present disclosure. Method 300 may overcome the deficiencies of the traditional database export operation noted in the foregoing, by exporting all relevant structural data that may be needed for the proper functioning of the exported database container in a new location, but not exporting the data content (e.g., customer data) in the database container to avoid the risk of improper disclosure of the data content at the new location.

Method 300 may be implemented (e.g., by DBMS 130) to export, for example, database container 200 from database 110 to database 120. Method 300 may include, first, exporting container metadata 207 including artifact definitions in the metadata (e.g., tables, views, etc.) along with the metadata content to the DBMS (302). Method 300 may further involve exporting container 200 including the database objects deployed therein (e.g., view 201, table 202, synonym 203, etc.) to the DBMS (304). Exporting container 200 to the DBMS 304 may include exporting all dependencies and structures of the deployed database objects (e.g., private synonyms, generic application data object 208, etc.) but specifically exclude exporting the data content (e.g., field values) of the database objects. In other words, exporting container 200 to the DBMS 304 may specifically exclude all customer data that may be stored in the deployed database objects (e.g., table 202, etc.).

Method 300 may also include exporting common metadata (e.g., common metadata 209), which may describe common database objects deployed outside of, or external to, database container 200 (306). The common database objects (e.g., calculation views, shadow tables, etc.) may use objects stored in database container 200, but may not be limited to using only objects stored in database container 200. Exporting common metadata 209 may involve extracting and exporting only the data subsets (of the common database objects) that are related to container 200. In some implementations, the export of common metadata 209 may be accomplished using predefined SQL statements. Extracting and exporting only the container-related data subsets may, for example, further include creating tables with the same structures as the common database objects identified by common metadata 209 and transferring only container-related data rows to the created tables.

Method 300 may lastly include packing a complete export data set (i.e., the data received at 302, 304, and 306) into an export archive or file (e.g., archive 132) at DBMS 130 (308).

Archive 132 produced by method 300 may be a binary file. Archive 132 may be used by DBMS 130 to import database container 200 into another database (e.g., database 120) by unpacking the data packed in the export archive or binary file.

Figure 4:
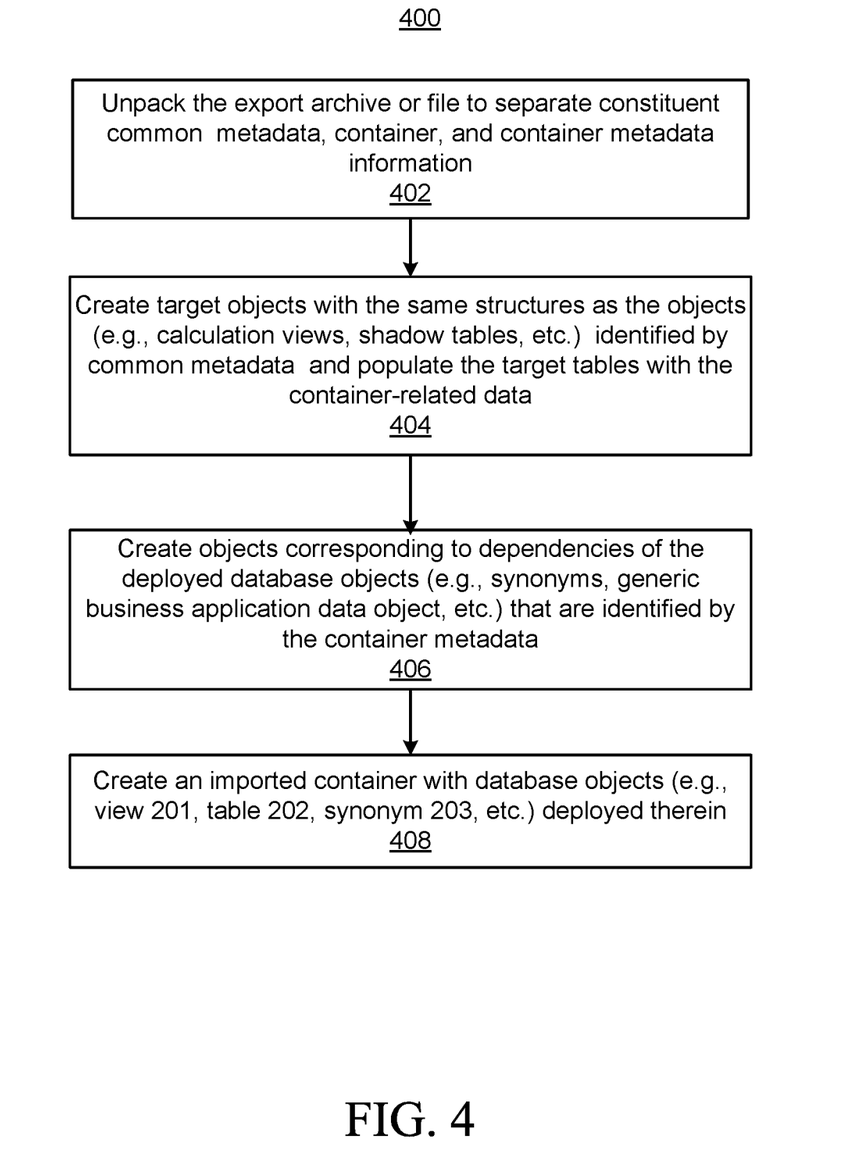
FIG. 4 is a flowchart illustrating an example method for importing a database container into a database, in accordance with the principles of the present disclosure.

FIG. 4 is a flowchart for an example data container import method 400, which complements data container export method 300, in accordance with the principles of the present disclosure.

Method 400 may include unpacking the export archive or file to separate the constituent common metadata, container, and container metadata information (402). Method 400 may include creating target objects in a target database (e.g., database 120) with the same structures as the objects identified by common metadata 209 and populating the created target objects (e.g., tables) with the container-related data (e.g., data rows) (404)). Method 400 may further include creating, in the target database (e.g., database 120), database objects corresponding to dependencies of the deployed database objects (e.g., synonyms, generic application data object 208, etc.) that are identified by the container metadata (406), and creating an imported database container with database objects (e.g., view 201, table 202, synonym 203, etc.) deployed therein (408). The imported database container and the deployed database objects therein may have the same structures and dependencies as the database container exported from the first database. However, the imported database container and the deployed database objects therein but may not include the actual data content of the database container of the first database in the imported database container.

When database container 200 of database 110 includes a synonym object (e.g., synonym 203) referencing an object (e.g., table 204) external to database container 200, method 400 further includes creating a target object in database 120 corresponding to the object external to database container 200 in the database 110 referenced by the synonym object.

It will be noted that in import method 400, the steps of export method 300 are performed substantially in reverse order.

In example implementations of DBMS 130, the methods for exporting and importing the database container (e.g., export method 300 and import method 400) may be initiated by using "CALL" SQL commands (e.g., CALL EXPORT (ext. parameter) and CALL IMPORT (ext. parameter), respectively).

In general, the foregoing database container export and import methods (e.g., method 300 and method 400, respectively) specifically exclude transfer of the data content (e.g., customer data) of the container database objects and the related artifacts from database 110 to database 120 to avoid the risk of improper disclosure of the data content at the new location. Only the structures of the container database objects and the related artifacts, and non-sensitive data are transferred (e.g., from database 110 to database 120) by the export and import methods.

However, in some scenarios, it may be desirable to include transfer of customer data or other sensitive data (e.g., the actual content or data rows of tables accessed by view 201, table 202, or generic application data object 208) in the database container export and import methods. An example use case for exporting a database container with sensitive data would be to back up a current database container. In case of a corrupted database container, or undesired changes to the database container, in a database, the current database container could be deleted and replaced by an import of the backup database container. For such a backup scenario, database container export and import methods (e.g., method 300 and method 400, respectively) may be modified to accommodate transfer of the sensitive data along with the transfer of the database container. For example, in a modified version of method 300, exporting container 200 at 304 to the DBMS, in addition to exporting all structures and dependencies of the deployed database objects (e.g., synonyms, view 201, table 202, generic business application data object 208, etc.) may include exporting the actual content of the database objects (e.g., the actual content of view 201, table 202, generic business application data object 208, etc.). Whether the data content of a database object is included in the export or import of a database container may be controlled by a parameter passed to method 300 or method 400, respectively.

In example implementations of DBMS 130, the modified versions of methods 300 and 400 may be activated, for example, by YES or NO options in the CALL commands (e.g., EXPORT CALL (ext. parameter, private data=YES or NO) and IMPORT CALL (ext. parameter, sensitive data=YES or NO), respectively) for initiating the export and import methods.

It will be noted that the database container export and import methods (e.g., methods 300 and 400), which are described herein with reference to FIGS. 1-4 herein, may be used to transfer database containers (e.g., container 200) which have been previously deployed in the databases as run-time containers (RTC).

In some example database system implementations, the RTC can be created or deployed in databases (e.g., database 110) by conversion or transformation of design-time artifacts in corresponding design-time containers (DTC) previously created in a deployment infrastructure (DI) coupled to, or part of a DBMS (e.g. DBMS 130). The container deployment methods may use artifact type-specific conversion engines (or "build plug-ins") to convert or transform design-time artifacts in a DTC into run-time database objects in a run-time container (RTC). For example, a view-type conversion engine may be used to convert view-type design-time artifacts into run-time view objects in the run-time container. The DTC may be used to store design-time artifacts in the DI, and the corresponding RTC (e.g., database container 200) may be used to store the corresponding deployed run-time database objects (e.g., view 201, table 202, synonym 203, etc.) in database 110. The architecture of DI may distinguish design-time artifacts from run-time database objects, for example, by introducing the following, distinct but associated container types:

(a) Design-time container (DTC) as an isolated environment for design-time artifacts or files, and (b) Run-time container (RTC) as a store of the deployed database objects that are built according to the specification stored in the corresponding design-time artifacts or files in the DTC.

The database container export and import methods (e.g., method 300 and method 400) described herein can export and import a RTC (e.g. database container 200), respectively, without involving any artifact conversion engines or build plug-ins that may have been previously used to transform or deploy design-time artifacts in a DTC as database objects in the RTC. Once a RTC for one database has been created (e.g., by developers/administrators) from design-time artifacts in a DTC, the same RTC may be copied or propagated to a second database by methods 300 and 400.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for exporting a database container from a database, the method comprising:

exporting, by the database and to a database management system (DBMS) managing at least two databases including the database, database container metadata of the database container, the database container metadata including artifact definitions identifying one or more tables or views in the database container metadata along with object metadata content;

exporting, by the database and to the DBMS, the database container, the database container including one or more database objects deployed in the database container, and a database container schema providing an isolated computing environment for the one or more database objects deployed in the database container, wherein exporting the database container includes exporting dependencies and structures of the one or more database objects deployed in the database container, without exporting data content of the one or more database objects; and packing, by the DBMS, the exported database container metadata and the exported database container in an archive.

2. The computer-implemented method of claim 1, wherein exporting the database container includes:
exporting dependencies and structures of the deployed one or more database objects; and
in response to a user request, exporting data content of the deployed one or more database objects.

3. The computer-implemented method of claim 1, wherein exporting the database container includes exporting a synonym object deployed in the database container as a link to an object external to the database container in the database.

4. The computer-implemented method of claim 1 further comprising:
exporting common metadata in the database; and
packing the exported common metadata in the archive along with the exported database container metadata and the exported database container.

5. The computer-implemented method of claim 4, wherein exporting common metadata in the database includes:
using predefined SQL statements of the DBMS; and
extracting only container-related data subsets.

6. The computer-implemented method of claim 5, wherein extracting only container-related data subsets includes:
creating tables with the same structures as the objects identified by the common metadata; and
transferring only container-related data rows.

7. The computer-implemented method of claim 1 further comprising unpacking data saved in the archive in substantially reverse order to import the database container into another database.

8. A non-transitory computer readable storage medium having instructions stored thereon, including instructions which, when executed by a microprocessor, cause a computer system to:
export, by a database and to a database management system (DBMS) managing at least two databases including the database, database container metadata of the database container, the database container metadata including artifact definitions identifying one or more tables or views in the database container metadata along with object metadata content;
export, by the database and to the DBMS, the database container, the database container including one or more database objects deployed in the database container, and a database container schema providing an isolated computing environment for the one or more database objects deployed in the database container, wherein exporting the database container includes exporting dependencies and structures of the one or more database objects deployed in the database container, without exporting data content of the one or more database objects; and
pack, by the DBMS, the exported database container metadata and the exported database container in an archive.

9. The non-transitory computer readable storage medium of claim 8, wherein exporting the database container includes:
exporting dependencies and structures of the deployed one or more database objects; and
in response to a user request, exporting data content of the deployed one or more database objects.

10. The non-transitory computer readable storage medium of claim 8, wherein exporting the database container includes exporting a synonym object deployed in the database container as a link to an object external to the database container in the database.

11. The non-transitory computer readable storage medium of claim 8, the instructions further causing the computer system to:
export common metadata in the database; and
pack the exported common metadata in the archive along with the exported database container metadata and the exported database container.

12. The non-transitory computer readable storage medium of claim 11, wherein exporting common metadata in the database includes:
using predefined SQL statements of the DBMS; and
extracting only container-related data subsets.

13. The non-transitory computer readable storage medium of claim 12, wherein extracting only container-related data subsets includes:
creating tables with the same structures as the objects identified by the common metadata; and
transferring only container-related data rows.

14. The non-transitory computer readable storage medium of claim 8, the instructions further causing the computer system to:
unpacking data saved in the archive in substantially reverse order to import the database container into another database.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
exporting, by a database and to a database management system (DBMS) managing at least two databases including the database, database container metadata of the database container, the database container metadata including artifact definitions identifying one or more tables or views in the database container metadata along with object metadata content;
exporting, by the database and to the DBMS, the database container, the database container including one or more database objects deployed in the database container, and a database container schema providing an isolated computing environment for the one or more database objects deployed in the database container, wherein exporting the database container includes exporting dependencies and structures of the one or more database objects deployed in the database container, without exporting data content of the one or more database objects; and packing, by the DBMS, the exported database container metadata and the exported database container in an archive.

16. The computer-implemented system of claim 15, wherein exporting the database container includes:
exporting dependencies and structures of the deployed one or more database objects; and
in response to a user request, exporting data content of the deployed one or more database objects.

17. The computer-implemented system of claim 15, wherein exporting the database container includes exporting a synonym object deployed in the database container as a link to an object external to the database container in the database.

\* \* \* \* \*